Patented Apr. 20, 1943

2,316,889

UNITED STATES PATENT OFFICE

2,316,889

MINERAL OIL COMPOSITION AND IMPROVING AGENT THEREFOR

Orland M. Reiff, Woodbury, N. J., Ferdinand P. Otto, Philadelphia, Pa., and John J. Giammaria, Riverside, and Edward A. Oberright, Woodbury, N. J., assignors to Socony-Vacuum Oil Company, Incorporated, New York, N. Y., a corporation of New York No Drawing. Application January 20, 1940, Serial No. 314,794

12 Claims. (Cl. 252—57)

This invention has to do in a general way with mineral oil compositions and is more particularly related to compositions comprised of a mineral oil fraction and a minor proportion of an added ingredient which will improve the oil in one or more important respects. It is an object of this invention to provide a novel class of improving agents for use in mineral oil fractions and further to provide mineral oil compositions containing such improving agents.

It is a further object of this invention to provide a viscous mineral oil composition in which the pour point has been substantially depressed or in which the viscosity index has been substantially improved or in which a depression of pour point and improvement of viscosity index have been effected with a novel improving agent.

The novel oil-improving agents contemplated herein may be broadly classified as oil-miscible alkyl-substituted aromatic-aliphatic carboxylic acids. More specifically, these aromatic-aliphatic acids are characterized by the fact that at least one nuclear hydrogen atom of the aromatic nucleus is substituted with a heavy alkyl group, preferably containing at least twenty carbon atoms; and for this characterizing alkyl substituent, which is largely contributory to the pour point-depressing and viscosity index-improving properties of these compounds, special preference is given to alkyl or aliphatic hydrocarbon groups derived from petroleum wax. The oil-improving agents contemplated herein may also be characterized as aromatic condensation products having an aromatic nucleus in which at least one nuclear hydrogen atom is substituted with an "alkyl-carboxyl" radical and in which at least one other nuclear hydrogen atom is substituted with an aliphatic hydrocarbon radical having at least twenty carbon atoms.

The aromatic nucleus characterizing the compounds contemplated by this invention may be either mono- or poly-cyclic, and it may contain substituents other than the two characterizing types of substituents mentioned above. For example, the aromatic nucleus may be a mono- or polycyclic aromatic hydrocarbon nucleus which in addition to the aforementioned substituents has at least one of the nuclear hydrogen atoms substituted with a radical selected from the group consisting of: hydroxyl, alkoxy, aroxy, aralkyl, aryl, alkaryl, halogen, nitro, amino and organic ester radicals and alkyl groups containing less than 20 carbon atoms. It is to be understood that the term aromatic as used herein is intended in its broad sense to include aryl nuclei having substituents of the general type classified above. Of these various substituted aromatic nuclei special preference is given to compounds of the general type indicated above in which at least one hydrogen atom of the characterizing aromatic nucleus is substituted with a hydroxyl radical.

The high molecular weight aliphatic substituents, which, as stated above, should contain at least 20 carbon atoms, may be derived from pure or substantially pure aliphatic hydrocarbon compounds, or they may be derived from a mixture predominantly comprised of these high molecular weight aliphatic hydrocarbons containing at least 20 carbon atoms. Such a mixture is typified by petroleum waxes such as paraffin wax, which because of its availability and the ease with which the compounds may be synthesized therefrom is considered as a preferred source for the heavy alkyl substituents in the oil-improving agents contemplated herein.

Since the miscibility or solubility of these oil-improving agents, and particularly their multifunctional properties, are controlled or governed by the heavy alkyl substituent, the extent to which the aromatic nucleus is substituted with these heavy alkyl groups becomes an important factor in obtaining products having the desired properties. This degree of substitution in the aromatic nucleus will vary more or less depending upon the aliphatic hydrocarbon group which carries the carboxyl radical—that is, whether such group is a short or long chain hydrocarbon group—and will also vary depending upon whether or not the aromatic nucleus is mono- or polycyclic and whether such nucleus carries other substituents. In general it may be said, however, that the aromatic nucleus should have at least one of the nuclear hydrogen atoms substituted with an aliphatic hydrocarbon group containing at least 20 carbon atoms, and it is preferable that the average composition of these complex organic acids should be such that the aromatic nucleus carries two or three heavy alkyl groups. In case the aliphatic constituent in the alkyl-carboxyl radical is of high molecular weight—that is, of the type derived from stearic acid—the degree of heavy alkyl or wax-substitution may be less than is required to give the same properties to a compound in which the alkyl-carboxyl group is derived from a low molecular weight acid such as acetic acid.

Another important factor to be observed in connection with the oil-improving agents contemplated herein is that the heavy alkyl group, particularly when such group is derived from petroleum wax, may be either mono- or polyvalent. In other words, such group may be in the nature of a long free chain attached to the aromatic nucleus or it may be a long aliphatic chain to which several of the aromatic-aliphatic carboxyl groups are attached. In the event several of these nuclei are attached to a single paraffin wax hydrocarbon chain, for example, it will be seen that the solubilizing effect of the aliphatic group is distributed among the several nuclei, and we have found that a mineral oil-improving agent of the desired properties is not obtained if the composition is predominantly comprised of compounds in which more than four of the aromatic-alkyl carboxyl complexes are attached to a single long chain hydrocarbon radical.

It is also to be understood that if the so-called polyvalent high molecular weight aliphatic hydrocarbon groups are present, each aromatic complex may carry several of such groups, which in turn may be combined with other aromatic complexes to form a condensation product of a lattice type, wherein from 2 to 4 of the aromatic-alkyl carboxyl nuclei are interconnected by two or more aliphatic hydrocarbon chains of 20 or more carbon atoms.

The so-called "alkyl-carboxyl" group, which constitutes the other characterizing substituent in the aromatic nucleus of the mineral oil-improving agents contemplated herein, may be either aliphatic or cyclo-aliphatic and may be derived from the corresponding organic acids of various molecular weights. In this regard it is to be understood that the term alkyl or aliphatic, when used herein in connection with the alkyl carboxyl group, has reference to both aliphatic and cyclo-aliphatic radicals, and that this alkyl carboxylic group may contain at least one substituent selected from the group consisting of: alkyl, aralkyl, alkaryl, aryl, keto, ether, hydroxyl, halogen, nitro, and amino radicals. Also, this alkyl-carboxyl group may be mono- or polybasic.

From the foregoing discussion and from the description of the preferred synthesizing procedures which will appear hereinafter, it will be seen that the specific molecular composition of the mineral oil-improving agents contemplated herein may vary over relatively wide limits, depending upon whether the aromatic nucleus is mono- or poly-cyclic, whether it carries substituents other than the heavy alkyl group or groups and the alkyl-carboxyl group, whether the condensation of the aromatic nucleus with the heavy alkyl substituent is effected with a pure compound or a mixture of aliphatic hydrocarbon compounds, etc. The composition will also vary, depending upon the aliphatic carboxyl group and whether such group is substituted or unsubstituted. In general, however, all of the compounds contemplated herein as mineral oil-improving agents, whether such compounds be existant in a pure state or in admixture with other compounds of a similar nature, may be represented by the following general formula:

I       $R^v(T(Z.COOH)Y_b)_n$

In the above general formula T represents a mono- or poly-cyclic aromatic nucleus; Z represents an organic radical, or more specifically an aliphatic or cyclo-aliphatic hydrocarbon group, which is substituted for one of the nuclear hydrogen atoms in the aromatic nucleus T; COOH represents at least one carboxyl group attached to the aliphatic or cyclo-aliphatic radical represented by Z. The character $R^v$ represents at least one aliphatic hydrocarbon radical of at least 20 carbon atoms having a valence $v$ of from 1 to 4 and attached by one valence bond only to at least one aromatic nucleus T. $Y_b$ represents a monovalent radical attached to T, such radical being selected from the group consisting of residual hydrogen and hydroxyl, alkoxy, aroxy, aralkyl, aryl, alkaryl, halogen, nitro, amino and organic ester radicals and monovalent alkl radicals containing less than 20 carbon atoms. The character $b$ in the symbol $Y_b$ represents the number of $Y_b$ radicals and is equal to zero or a whole number corresponding to the replaceable hydrogen atoms on the nucleus T not substituted with $R^v$ and (Z.COOH). The subscript $n$ represents a whole number from 1 to 4.

In the foregoing general formula representation of the oil-improving agent contemplated herein it will be seen that the compounds represented thereby include those materials in which all of the high molecular weight substituent ($R^v$) is monovalent ($v=1$ and $n=1$) or in which all of this heavy alkyl substituent is polyvalent ($v$ and $n$ being equal to 2, 3 or 4); also, since $R^v$ is defined as being at least one aliphatic radical having at least 20 carbon atoms and may therefore include several such groups, it will be seen that this general formula is inclusive of compounds containing these heavy alkyl radicals of different valences (from 1 to 4) in the same molecule. Furthermore, it will be observed that since $n$ may be any whole number from 1 to 4, the number of aromatic nuclei T in the molecule may likewise vary from 1 to 4. It will be seen, therefore, that the relationship between $n$ and $v$ in its broadest aspect is such that when $n$ is equal to 1, $v$ is equal to 1; and when $n$ is greater than 1, the valence $v$ of at least one of the $R^v$'s is equal to $n$ in order to tie the several nuclei or T's together, the valence of any remaining $R^v$'s being any whole number equal to or less than $n$.

Typical compounds coming under the foregoing general formula and characterized by both mono- and poly-cyclic aromatic nuclei may be represented by the following formulae, wherein at least one R' represents an aliphatic hydrocarbon radical containing at least 20 carbon atoms and in which the remaining R's represent radicals selected from the group consisting of hydrogen, alkoxy, hydroxyl, aroxy, aralkyl, aryl, alkaryl, halogen, nitro, amino and organic ester radicals and alkyl radicals containing less than 20 carbon atoms.

II
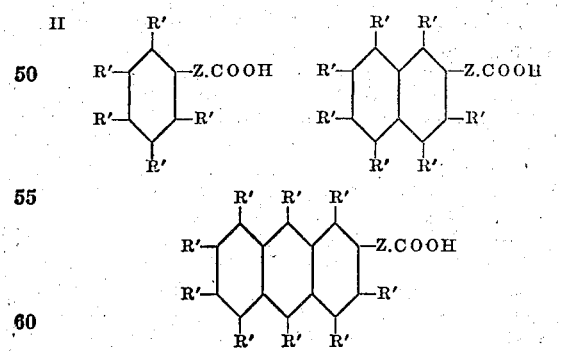

A compound of the foregoing type represented in another way may be expressed by the formula:

III
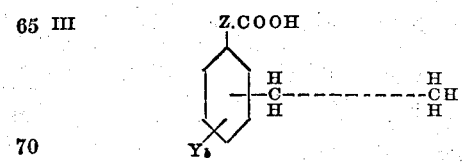

in which the chain represents the heavy alkyl group of at least 20 carbon atoms and in which $Y_b$ represents substituents as defined above under general Formula I.

Of the compounds carrying a $Y_b$ substituent, as has been previously pointed out, particular preference is given to those in which this substituent is a hydroxyl group, such preferred group of compounds having a mono-cyclic nucleus and a mono-wax substituent being indicated by the following general formula:

IV
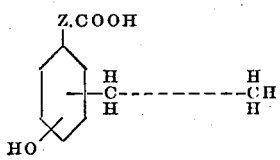

The foregoing Formulae II to IV inclusive represent the simplest types of alkyl-substituted aromatic-aliphatic carboxylic acids which are contemplated herein as mineral oil-improving agents. In all of these general formulae it will be observed that the heavy alkyl substituent is monovalent, and in the general Formulae III and IV it will be observed that the aromatic nucleus carries only one such substituent.

Since the group $R^v$ has been defined in the general formula has at least one and since, as pointed out above, it is preferable in most cases that the aromatic nucleus be polysubstituted with these heavy alkyl groups, it will be seen that a compound of the type represented by Formula III above may in the case of polysubstitution be represented by the general formula:

V
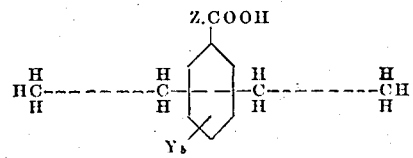

in which the chains and the substituent characters have the same significance defined above.

It has been pointed out that the condensation products contemplated herein may be comprised of several (2, 3 or 4) of the aromatic nuclear complexes attached to one or more of the long chain aliphatic hydrocarbon radicals. Compounds of this general nature are represented by the general Formula I above wherein $v$ and $n$ become 2, 3 or 4. A compound of this type in which there is only one $R^v$ group and in which $v$ is equal to 3 may be represented by the formula:

VI
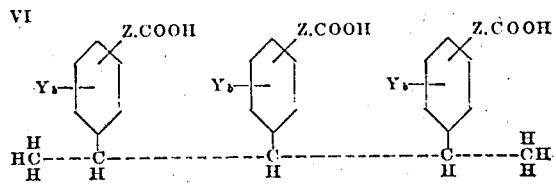

A compound of this type in which the several aromatic nuclear complexes are interconnected by several of the heavy alkyl radicals may be represented by the following formula:

VII
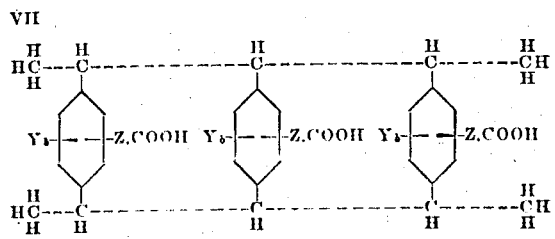

The possible molecular structure of compounds in which the aryl nucleus T is poly-cyclic will be obvious from the foregoing illustrative formulae. The possible molecular structure of compounds in which $v$ and $n$ are equal to 2 and 4 will be readily understood from the Formulae VI and VII.

Relative to the Formulae VI and VII it will be understood that the several nuclear complexes may reach or all carry monovalent heavy alkyl groups in addition to the wax group or groups connecting them to other nuclear complexes; also the compound may be comprised of one heavy alkyl group attached to say two of the nuclear complexes and another heavy alkyl group attached to three or four of the nuclear complexes. As to the possible number of these heavy alkyl or $R^v$ groups going to make up a single molecule, this will vary with the extent to which it is desired to effect substitution of the nucleus with these multifunctional-imparting substituents.

In synthesizing the oil-improving agents contemplated herein the general procedure involves first condensing a high molecular weight aliphatic hydrocarbon material with the desired aromatic compound, which, as aforesaid, may carry other substituents such as a hydroxyl group. In this condensation reaction pure or substantially pure high molecular weight aliphatic compounds may be employed; or, as has also been previously indicated, the aliphatic material may be a mixture predominantly comprised of aliphatic compounds having at least 20 carbon atoms, such a mixture being typified by paraffin wax. The condensation may be effected by first halogenating the aliphatic material and condensing same with the aromatic material by means of Friedel-Crafts catalytic reaction. This condensation may also be carried out with high molecular weight unsaturated aliphatic hydrocarbons or with high molecular weight alcohols, using sulfuric acid or aluminum chloride as catalyst. Also, the high molecular weight alcohol may be converted to the corresponding halide and condensed with the aromatic material by means of the Friedel-Crafts reaction. Since paraffin wax is considered to be the preferred source for the heavy aliphatic substituents, we may hereinafter refer to this alkylated aromatic condensation product as a wax-aryl compound. By this term it is to be understood that we include wax-aromatic compounds in which the aromatic nucleus contains another or other substituents such as a hydroxyl group, an ether group, etc.

After obtaining the wax-aromatic condensation product, such product is condensed with an aliphatic or cyclo-aliphatic carboxylic acid to obtain the alkylated aromatic-alkyl carboxylic acid.

Specific procedures which may be followed in effecting the condensation between the wax-aromatic compound and the aliphatic acid are as follows:

(a) Condensation of alkylated aromatic or hydroxyaromatic compounds with unsaturated aliphatic acid such as oleic acid, using a so-called kationoid catalyst such as sulfuric acid, zinc chloride, aluminum chloride, etc., to effect the addition of the unsaturated acid to the aryl nucleus.

(b) Condensation of an alkylated aromatic or hydroxyaromatic hydrocarbon with halogenated aliphatic or cyclo-aliphatic acids, such as chloracetic, chlorstearic and chlornaphthenic acids, by means of the Friedel-Crafts reaction using anhydrous aluminum chloride as the preferred catalyst.

(c) In the case of acids of the type contemplated herein which contain a hydroxyl substituent in the aromatic nucleus, such acids may be prepared by a rearrangement of the corresponding alkylated aryl ether aliphatic acids in the presence of a kationoid catalyst such as HCl gas.

(d) Hydroxyaryl-aliphatic acids can be converted to the corresponding ether aryl-aliphatic acids by methylating the hydroxyl group by reaction with alkylating agents like dimethyl sulfate or alkyl halides or by reaction with arylating agents such as aryl halides.

In the event a compound is desired in which the aromatic nucleus contains as a substituent alkoxy, ester, nitro, or amino groups, it is necessary to introduce such groups into the compound after the condensation with the aliphatic acid has been completed.

Examples of the aromatic compounds which may be used as starting materials for the alkylation or wax-condensation reaction for obtaining either a product in which the aromatic nucleus is otherwise unsubstituted or a product in which the aromatic nucleus carries a hydroxyl group are as follows: benzene, naphthalene and anthracene (either substituted or unsubstituted); phenol, chlorphenol, resorcinol, hydroquinone, catechol, cresol, hydroxydiphenyl, benzylphenol, alpha- and beta-naphthol and beta-methylnaphthol, anthranol, phenylmethylnaphthol, etc.; and aryl ethers such as diphenyl ether and naphthyl ether, or mixed alkyl-aryl or aralkyl-aryl ethers such as anisole, naphthylmethyl ether and benzylphenyl ether. Preference in general, as has been previously indicated, is to the mono- and poly-cylic aromatics (preferably naphthalene) and to the mono-hydroxyphenols otherwise unsubstituted, particular preference being given to phenol and alpha- and beta-naphthol.

As sources for the heavy alkyl multifunctional-imparting substituents we prefer to use, as has been previously indicated, a mixture of high molecular weight aliphatic hydrocarbons such as characterize petroleum wax, particular preference being given to paraffin wax.

Other sources of the heavy alkyl substituent are high molecular weight unsaturated aliphatic hydrocarbons such as polymerized iso-butylene, dodecylene, tetradecylene, octadecylene, melene, etc., and high molecular weight alcohols, such as myricyl alcohol, ceryl alcohol, etc.

As has been previously indicated, the alkyl-carboxyl substituent may be derived from any aliphatic or cyclo-aliphatic mono- or polybasic carboxylic acid, illustrative sources of which are acetic, butyric, valeric, heptylic, nonylic, palmitic, and stearic acids, which typify saturated acids, and must be used as the corresponding halogen-acid in which substitution takes place at the alpha carbon atoms of the aliphatic acid group. Other aliphatic acid substituents may be obtained by using unsaturated acids such as oleic acid, $C_nH_{2m-2}O_2$, in which case substitution on the nucleus takes place at the double bond in the unsaturated acid. Halogenated cyclo-aliphatic acids such as chlor-naphthenic acid may be used to obtain compounds in which the alkylated aromatic group carries a cyclo-aliphatic substituent. The term "alkyl" or "aliphatic" when used herein in connection with the aliphatic-carboxyl substituent is intended as inclusive of both aliphatic and cyclo-aliphatic acid groups or radicals.

The details in the procedure which may be followed in synthesizing alkylated aromatic-aliphatic carboxylic acids of the type contemplated herein will be best understood from the following examples of specific procedures used in synthesizing typical complex acids. It is to be understood in this connection that these examples are for illustration only and that the procedure may be varied by varying the specific reactants and the proportions thereof.

EXAMPLE ONE

PREPARATION OF WAX-SUBSTITUTED HYDROXYPHENYL STEARIC ACIDS (a) Alkylation of phenol A paraffin wax melting at approximately 126° F. was melted and heated to about 200° F., after which chlorine gas was bubbled therethrough until the wax had absorbed from 16 to 20 per cent of chlorine, such product having an average composition between a monochlor-wax and a dichlor-wax or corresponding roughly to a dichlor-wax. A quantity of the chlor-wax thus obtained containing 3 atomic proportions of chlorine was heated to a temperature varying from just above its melting point to not substantially over 150° F., and 1 mol of phenol was admixed therewith. To this mixture at a temperature of about 150° F. was added a quantity of anhydrous aluminum chloride corresponding to about 3 per cent of the weight of the chlor-wax in the mixture. The rate of addition of the aluminum chloride should be sufficiently slow to avoid violent foaming, and during such addition it is preferable to maintain the temperature in the neighborhood of 150° F. After adding the aluminum chloride the temperature is raised, preferably to a point not over 350° F., until the emission of HCl gas has substantially ceased, thus indicating a completion of the alkylation or wax-substitution of the phenol. The product thus obtained, where the quantity of chlor-wax containing three atomic proportions of chlorine was reacted with one mol of phenol, may be roughly designated as a triwax-phenol. A more accurate description of the product, however, is obtained through the use of the parenthetical symbol (3—16), which indicates that chlor-wax of 16 per cent chlorine content was used in the reaction and that a quantity of such chlor-wax containing 3 atomic proportions of chlorine was reacted with one mol of the phenol. This type of indication will be used herein to indicate the degree of wax-substitution of the aryl nucleus; that is, the parenthetical expression (A—B) will be employed, wherein A indicates the number of atomic proportions of the chlor-wax reacted with one mol of the aromatic compound (3 in the above case) and wherein B indicates the chlorine content of the wax or chlorinated heavy aliphatic hydrocarbon which is employed in the reaction (16 per cent in the above case). Employing this designation, then, the product of the foregoing reaction will be indicated as wax-phenol (3—16), and the corresponding aliphatic acid derivative of this condensation product will be indicated, for example, wax-substituted (3—16) hydroxyphenyl stearic acid or wax-phenol stearic acid (3—16).

(b) Condensation of unsaturated aliphatic acids with wax-substituted hydroxyaromatic compounds

| Reaction mixture | Mol |
|---|---|
| Wax-phenol (3—16) | 1 |
| Oleic acid | 1 |
| AlCl₃ | 1 |

The wax-phenol of the type obtained according to the foregoing procedure and the oleic acid are mixed together, after which the aluminum chloride is added gradually with stirring at a temperature of about 150° F. The slow addition of the aluminum chloride is necessary to control the evolution of HCl gas. The reaction temperature is then raised to about 250° F., the mixture being held at this temperature during a two-hour period to complete the reaction. The reaction product is then washed with dilute hydrochloric acid to remove the aluminum chloride catalyst, followed by water-washing until neutral. This is followed by steam-treatment to remove any unreacted aliphatic acid. The water-washing is carried out preferably in the presence of a diluent such as benzol or Stoddard solvent, thereafter distilling the solvent, whereby any entrained water is removed. This is followed by introduction of superheated steam at a temperature of about 390° F. The operation of steam-treating is facilitated by vigorous stirring, the steam being passed through the mixture until the distillate shows a negligible neutralization number, indicating that all unreacted aliphatic acid in the product has been removed. When the steam treatment is finished, which may require about 10 hours, steam vapors are removed from the condensation product by blowing with a non-oxidizing gas such as nitrogen, thereby yielding an anhydrous product. The product of this reaction is wax-substituted (3—16) hydroxyphenyl stearic acid and distinguishes from the corresponding stearic acid obtained from chlor-stearic acid in that the substitution of the stearic acid group has been effected at an intermediate point in the chain.

Following the foregoing procedure and using a polycarboxylic acid such as maleic acid a dicarboxylic product is obtained, in this particular case the product being a wax-substituted hydroxyaryl succinic acid.

Wax-hydroxyphenyl stearic and wax-hydroxyphenyl capric acid have been prepared following the foregoing procedure by employing instead of the unsaturated acid in the oleic mixture one mol of a chlor-acid in the two cases mentioned, the acids being chlor-stearic acid and chlor-capric acid, respectively.

EXAMPLE TWO

PREPARATION OF WAX-SUBSTITUTED
NAPHTHYL ALIPHATIC ACIDS

In Example One above we have described an illustrative procedure for obtaining wax-substituted hydroxyaryl aliphatic acids. The preparation of wax-substituted aromatic-aliphatic carboxylic acids which are otherwise unsubstituted is illustrated by the following procedure used in preparing such acids wherein the aromatic nucleus is a naphthyl group.

(a) Alkylation of naphthalene

Paraffin wax having an A. S. T. M. melting point of about 126° F. is chlorinated at a temperature of from about 175° to 200° F. until the desired chlorine content (as high as 20 per cent of chlorine) is obtained. The wax is chlorinated preferably to a chlorine content of about 16 per cent. A quantity of this chlor-wax which contains about 3 atomic proportions of chlorine is heated to a temperature of about 150° F. and 1 molecular equivalent of naphthalene is added thereto. Aluminum chloride is then added gradually to this mixture in the form of a slurry in a halogenated solvent such as ethylene chloride or tetrachlor-ethane. The condensation can be effected at the reflux temperature of the ethylene chloride, using about 3 per cent aluminum chloride based on the chlor-wax.

A suitable procedure also consists in adding the aluminum chloride to the mixture at about 250° F. in the absence of diluents or solvents. When a diluent or solvent is not used, this higher temperature for the addition of aluminum chloride is desirable to prevent foaming of the mixture because of HCl evolution. In order to obtain products having the most effective pour-depressing action it is desirable to form a tri- or tetra-substituted product. That is one in which the chlorine content of the wax and the proportions of wax and aromatic hydrocarbon are such that the aryl nucleus has 3 or 4 of its replaceable hydrogens substituted with the high molecular weight aliphatic hydrocarbon radicals.

(b) Condensation of wax-substituted naphthalene with aliphatic acids

In the condensation reaction with unsaturated or halogenated aliphatic or cyclo-aliphatic acids the Friedel-Crafts mixture obtained according to the foregoing reaction may be employed without removal of the aluminum chloride catalyst. The aliphatic acid is added to the mixture, followed by addition of sufficient aluminum chloride at a temperature of from 150° to 250° F. to give at least 1 mol of aluminum chloride in the mixture for each mol of aliphatic acid. The condensation reaction is carried to completion by heating the mixture to approximately 250° F. during a 1-hour period. At reaction temperatures lower than 250° F. it is desirable to add diluents such as halogenated solvents like ethylene dichloride or tetrachlor-ethane or hydrocarbon solvents such as Stoddard solvent. At these lower temperatures a higher concentration of catalyst or a longer reaction period is necessary, but the condensation can be carried out suitably at temperatures as low as the boiling point of ethylene dichloride (182° F.).

To illustrate this last-mentioned condensation procedure, 1 mol of wax-substituted naphthalene (3–19) and 1 mol of oleic acid are mixed together and heated to a temperature of about 150° F. 1 mol of aluminum chloride is then added to the reaction mixture with stirring to avoid too rapid evolution of HCl, and the temperature is raised to about 250° F., where it is held during a 1-hour period to complete the reaction. The reaction mixture is purified in the same manner employed for the purification of the wax-hydroxyaromatic stearic acid described in Example One. Polybasic alkylated aromatic-aliphatic acids can be obtained by using unsaturated polybasic acids such as maleic acid, for example, in the foregoing procedure, which gives an alkylated aryl succinic acid.

Wax-naphthalene alpha-stearic acid can be obtained by using the foregoing procedure and a reaction mixture consisting of 1 mol of wax-substituted naphthalene, 1 mol of chlor-stearic acid, and 2 mols of aluminum chloride.

EXAMPLE THREE

PREPARATION OF WAX-SUBSTITUTED
ETHER ARYL ALIPHATIC ACIDS

Compounds of this type in which the substituent $Y_b$ in general Formula I is an alkoxy or an aroxy group can be prepared by condensation of alkylated (such as wax-substituted) aryl ethers with unsaturated aliphatic acids such as oleic acid, using so-called kationoid catalysts, to obtain the final complex acid. Halogenated aliphatic acids or halogenated cyclo-aliphatic acids such as chlor-stearic and chlor-naphthenic acids can be used in place of unsaturated aliphatic acids, using AlCl₃ as catalyst for the reaction.

These acids can also be prepared from hydroxyaryl aliphatic acids of the type derived by the procedure of Example One by alkylating the hydroxyl group. The alkali salt of the hydroxyaryl aliphatic acid is treated with an alkyl sulfate such as dimethyl sulfate or with alkyl or aryl halides to form the ether derivative.

These general procedures are more fully illustrated in the following examples.

(a) *Condensation of wax-substituted diphenyl ether with aliphatic acid*

A wax-substituted diphenyl ether (3—16) was prepared following the general procedure of Example One (a), using one molecular proportion of diphenyl ether and a quantity of chlorinated paraffin wax (16 per cent chlorine content) containing 3 atomic proportions of chlorine.

One mol of this wax-phenyl ether was mixed with one mol of oleic acid and a mol of AlCl₃ gradually added to the mixture with stirring at a temperature of about 150° F. The reaction was carried to completion by raising the temperature of the mixture to about 250° F. and holding at this point during a one-hour period.

Upon cooling to about 150° F. the reaction mixture was treated with water and kept acidic with aqueous HCl to remove all traces of aluminum, thereafter water-washing the mixture until the washings become neutral to litmus. The operation of water-washing can be facilitated by use of a diluent such as Stoddard solvent. The finished product is obtained by removal of the diluent by distillation, whereby the removal of entrained water is also effected.

When high molecular weight aliphatic acids such as oleic acid or high molecular weight cyclo-aliphatic acids such as naphthenic acid are used in the condensation reaction, the use of superheated steam is required for removal of unreacted aliphatic acid. This treatment is carried out by running steam into the mixture at a temperature of about 200° C. after removal of the AlCl₃ by water-washing. The steam-treating is carried out until the distillate shows negligible acidity.

The condensation of halogenated aliphatic acids with diaryl ethers is carried out by the same procedure outlined above for the unsaturated acids.

The foregoing condensation procedures may be carried out with the isolated alkylated or wax-substituted aryl ether or with the unpurified product from the Friedel-Crafts chlorwax-aryl ether condensation without isolating the intermediate product.

(b) *Preparation of ether aryl aliphatic acids from hydroxyaryl aliphatic acids*

One mol of wax-hydroxyphenyl stearic acid (3—16) was dissolved in butyl alcohol and two atomic proportions of metallic sodium were added. The reaction mixture was heated at approximately 170° F. for ½ hour to form the disodium salt of wax-hydroxyphenyl stearic acid. The reaction mixture was cooled to room temperature and one mol of dimethyl sulfate added. After stirring for one hour the mixture was heated at approximately 180° F. for two hours to complete the reaction.

Any ester formed in the reaction was saponified by adding aqueous NaOH and refluxing for several hours. The mixture was then acidified with aqueous HCl to give free wax-substituted ether aryl aliphatic acid, which was then washed free of mineral acid. (The addition of Stoddard solvent facilitates the water-washing.) The finished product was obtained by removal of any diluent (including entrained water) by distillation. The product of the procedure was "wax-methoxyphenyl stearic acid (3—16)."

EXAMPLE FOUR

PREPARATION OF WAX-SUBSTITUTED ESTER ARYL ALIPHATIC ACIDS

Compounds of this type are those in which the substituent Y_b in general Formula I is an organic ester group. They may be prepared from wax-substituted hydroxyaromatic aliphatic acids of the type described in Example One by reaction with a mono- or dibasic acid chloride, using AlCl₃ as a catalyst. This reaction yields what we may term the ester (corresponding to the acid chloride) of the wax-hydroxyaromatic-aliphatic carboxylic acid, such for example as the phthalyl ester of wax-hydroxyphenyl stearic acid (3—16).

To demonstrate the effectiveness of the compounds or condensation products contemplated herein as mineral oil-improving agents we have conducted several comparative tests with representative mineral oils alone and with the same oils blended with the improving agents contemplated herein. The results of such tests are discussed and listed below.

EXAMPLE FIVE

The alkylated or wax-substituted aromatic-aliphatic acids typified by the foregoing examples are effective pour point depressants, as indicated by the results tabulated below in Tables I and II, which were obtained with motor oil having an A. S. T. M. pour point of +20° F.

*Table I*

| Depressant blended with motor oil of Saybolt viscosity of 67 secs. at 210° F. and pour point of +20° F. | Per cent in oil | A. S. T. M. pour test |
|---|---|---|
| | *Per cent* | °F. |
| Wax-hydroxyphenyl stearic acid (3–14) | ¼ | −15 |
| Wax-hydroxyphenyl capric acid (3–16) | ½ | −20 |
| Wax-naphthol stearic acid (3–14) | ¼ | −20 |
| Wax-naphthyl stearic acid (2–19) | 1 | −10 |
| Phthalyl ester of wax-hydroxyphenyl stearic acid (3–16) | ⅛ | −20 |

*Table II*

| Depressant blended with motor oil of Saybolt viscosity of 164.5 secs. at 100° F. and pour point of +20° F. | Per cent in oil | A. S. T. M. pour test |
|---|---|---|
| | *Per cent* | °F. |
| Wax-phenoxyphenyl stearic acid (3–16) | 1 | −15 |
| Wax-phenoxyphenyl alpha-stearic acid (3–16) | 1 | −20 |
| Wax-chlor-phenoxyphenyl capric acid (3–16) | 1 | −35 |

EXAMPLE SIX

VISCOSITY INDEX IMPROVEMENT

The oil-improving agents contemplated herein are effective to improve the viscosity index (V. I.) of various mineral oil fractions. This property is demonstrated by the data contained in Table III below, in which the viscosity index was obtained in the conventional manner from the Saybolt viscosity of the oil and the oil blend at 100° F. and 210° F. The oil used was a viscous oil of the lubricant type.

*Table III*

| Improving agent blended with motor oil | Conc. by wt. | Saybolt viscosity 100° F. | 210° F. | V. I. |
|---|---|---|---|---|
| | *Per cent* | | | |
| None | | 141.5 | 41.8 | 77.7 |
| Wax-hydroxyphenyl stearic acid (3–14) | 2 | 152.2 | 42.7 | 84.2 |
| Wax-hydroxyphenyl capric acid (3–16) | 2 | 150.7 | 42.5 | 81.4 |
| Wax-cresol stearic acid (2–16) | 2 | 152.6 | 42.9 | 83.6 |
| Wax-chlor-hydroxyphenyl stearic acid (2–16) | 3 | 155.3 | 42.9 | 84.3 |
| Wax-p-hydroxydiphenyl stearic acid (2–14) | 2 | 154.4 | 42.8 | 83.3 |
| Wax-amyl beta-naphthol stearic acid (3–18) | 2 | 157.9 | 43.1 | 85.2 |
| None | | 142.3 | 41.8 | 76.1 |
| Wax-naphthyl stearic acid | 2½ | 158.1 | 43.1 | 85.4 |
| None | | 141.5 | 41.8 | 77.7 |
| Wax-phenoxyphenyl stearic acid (3–16) | 3 | 153.5 | 42.9 | 87.2 |
| Wax-phenoxyphenyl capric acid (3–16) | 3 | 157.4 | 43.1 | 86.0 |
| Wax-methoxyphenyl stearic acid (3–16) | 4 | 164.1 | 43.6 | 87.7 |
| Wax-chlor-phenoxyphenyl capric acid (3–16) | 3 | 158.7 | 43.4 | 91.0 |
| None | | 140.7 | 41.8 | 79.3 |
| Phthalyl ester of wax-hydroxyphenyl stearic acid (3–16) | 1 | 153.5 | 42.8 | 84.7 |

From the foregoing data it will be observed that the complex acids described herein are effective improving agents for mineral oils. The amount of improving agent used may be varied, depending upon the mineral oil fraction and the properties desired in the final composition. For example, these agents may be used in amounts ranging from about 1/8 per cent to about 10 per cent, and in general mineral oil compositions of the desired improved properties may be obtained with these improving agents in amounts from about 1/8 per cent to about 2 per cent. It will be understood that these complex acids may be used with other addition agents such as extreme pressure bases and the like; also that the characterizing properties may be varied to suit a particular oil or to emphasize a particular property by varying the substituents on the aryl nucleus.

It is to be further understood that while we have herein described certain preferred procedures which may be followed in the preparation of wax-substituted aromatic-aliphatic carboxylic acids and have referred to various representative reactants which may be employed in providing the characterizing constituents of such acids, the said procedures and reactants have been used for illustrative purposes only. The invention, therefore, is not to be considered as limited by the specific examples given but includes within its scope such changes or modifications as fairly come within the spirit of the appended claims.

We claim:

1. An improved mineral oil composition comprising a viscous mineral oil fraction having admixed therewith a minor proportion of an alkyl-substituted aromatic-aliphatic carboxylic acid in which a carbon atom of the aromatic nucleus is directly attached to a carbon atom of the aliphatic group of said acid and in which the alkyl substituent is attached to the aromatic nucleus and is derived from an aliphatic hydrocarbon material having at least twenty carbon atoms.

2. An improved mineral oil composition comprising a viscous mineral oil fraction having admixed therewith a minor proportion of an alkyl-substituted aromatic-aliphatic carboxylic acid in which a carbon atom of the aromatic nucleus is directly attached to a carbon atom of the aliphatic group of said acid and in which the alkyl substituent is attached to the aromatic nucleus and is derived from an aliphatic hydrocarbon material having at least twenty carbon atoms, the said aromatic nucleus containing at least one hydroxyl substituent.

3. An improved mineral oil composition comprising a viscous mineral oil fraction having admixed therewith a minor proportion of an alkyl-substituted aromatic-aliphatic carboxylic acid in which a carbon atom of the aromatic nucleus is directly attached to a carbon atom of the aliphatic group of said acid and in which the alkyl substituent is attached to the aromatic nucleus and is derived from an aliphatic hydrocarbon material having at least twenty carbon atoms, the said aromatic nucleus containing at least one substituent selected from the group consisting of hydroxy, alkoxy, aroxy, aralkyl, aryl, alkaryl, halogen, nitro, amino and organic ester radicals and alkyl radicals containing less than twenty carbon atoms.

4. An improved mineral oil composition comprising a viscous mineral oil fraction having admixed therewith a minor proportion of an aromatic condensation product comprising an aromatic nucleus in which at least one nuclear hydrogen is substituted with an alkyl-carboxyl radical selected from the group consisting of aliphatic and cyclo-aliphatic carboxyl radicals, wherein a carbon atom of the alkyl group of said alkyl-carboxyl radical is directly attached to a carbon atom of said aromatic nucleus, and in which at least one other nuclear hydrogen atom of said characterizing aromatic nucleus is substituted with an aliphatic hydrocarbon radical of at least twenty carbon atoms.

5. An improved mineral oil composition comprising a viscous mineral oil fraction having admixed therewith a minor proportion of an aromatic condensation compound consisting of an aromatic nucleus in which at least one nuclear hydrogen atom is substituted with an alkyl-carboxyl radical selected from the group consisting of aliphatic and cycloaliphatic carboxyl radicals containing at least one substituent selected from the group consisting of alkyl, aralkyl, alkaryl, aryl, keto, ether, hydroxyl, halogen, nitro and amino radicals; in which a carbon atom of the alkyl group of said alkyl-carboxyl radical is directly attached to a carbon atom of said aromatic nucleus, and in which at least one other hydrogen atom of said aromatic nucleus is substituted with an aliphatic hydrocarbon radical containing at least twenty carbon atoms.

6. An improved mineral oil composition comprising a viscous mineral oil fraction having admixed therewith a minor proportion of an alkyl-substituted aromatic-aliphatic carboxylic acid in which a carbon atom of the aromatic nucleus is directly attached to a carbon atom of the aliphatic group of said acid and in which the alkyl substituent is attached to the aromatic nucleus and is an aliphatic hydrocarbon group of the type which characterizes petroleum wax.

7. An improved mineral oil composition comprising a viscous mineral oil fraction having admixed therewith a minor proportion of an alkyl-substituted aromatic-aliphatic carboxylic acid in which a carbon atom of the aromatic nucleus is directly attached to a carbon atom of the aliphatic group of said acid and in which the alkyl substituent is attached to the aromatic nucleus and is an aliphatic hydrocarbon group of the type which characterizes petroleum wax, the said aromatic nucleus containing at least one hydroxyl substituent.

8. An improved mineral oil composition comprising a viscous mineral oil fraction having admixed therewith a minor proportion of an alkyl-substituted aromatic-aliphatic carboxylic acid in which a carbon atom of the aromatic nucleus is directly attached to a carbon atom of the aliphatic group of said acid and in which the alkyl substituent is attached to the aromatic nucleus and is an aliphatic hydrocarbon group of the type which characterizes petroleum wax, the said aromatic nucleus containing at least one substituent selected from the group consisting of hydroxy, alkoxy, aroxy, aralkyl, aryl, alkaryl, halogen, nitro, amino and orgainc ester radicals and alkyl radicals containing less than twenty carbon atoms.

9. An improved mineral oil composition comprising a viscous mineral oil fraction having admixed therewith a minor proportion of an aromatic condensation product comprising an aromatic nucleus in which at least one nuclear hydrogen is substituted with an alkyl-carboxyl radical selected from the group consisting of aliphatic and cycloaliphatic carboxyl radicals in which a carbon atom of the alkyl group of said alkyl-carboxyl radical is directly attached to a carbon atom of said aromatic nucleus, and in which at least one other nuclear hydrogen atom of said characterizing aromatic nucleus is substituted with an aliphatic hydrocarbon radical of the type which characterizes petroleum wax.

10. An improved mineral oil composition comprising a viscous mineral oil fraction having admixed therewith a minor proportion of an aromatic condensation compound consisting of an aromatic nucleus in which at least one nuclear hydrogen atom is substituted with an alkyl-carboxyl radical selected from the group consisting of aliphatic and cyclo-aliphatic carboxyl radicals containing at least one substituent selected from the group consisting of alkyl, aralkyl, alkaryl, aryl, keto, ether, hydroxyl, halogen, nitro, and amino radicals; in which a carbon atom of the alkyl group of said alkyl-carboxyl radical is directly attached to a carbon atom of said aromatic nucleus, and in which at least one other hydrogen atom of said aromatic nucleus is substituted with an aliphatic hydrocarbon derived from petroleum wax.

11. An improved mineral oil composition comprising a viscous mineral oil fraction having admixed therewith a minor proportion of an alkyl-substituted aryl-stearic acid in which a carbon atom of the aryl nucleus is directly attached to a carbon atom of the stearic acid group and in which the alkyl substituent is an aliphatic hydrocarbon group of the type which characterizes petroleum wax and is attached to the aryl nucleus.

12. An improved mineral oil composition comprising a viscous mineral oil fraction and in admixture therewith a minor proportion of an oil-miscible aromatic-aliphatic acid having the general formula $R^v(T(Z.COOH)Y_b)_n$, in which T represents an aromatic nucleus; Z represents an alkyl radical a carbon atom of which is directly attached to a carbon atom of the nucleus T and is selected from the group consisting of aliphatic and cyclo-aliphatic hydrocarbon radicals; $COOH$ represents at least one carboxyl group attached to the radical Z; $R^v$ represents at least one aliphatic hydrocarbon radical of at least twenty carbon atoms and having a valence $v$ of from 1 to 4 and attached by one valence bond only to at least one aromatic nucleus T; $Y_b$ represents a monovalent radical attached to T and selected from the group consisting of residual hydrogen and hydroxy, alkoxy, aroxy, aralkyl, aryl, alkaryl, halogen, nitro, amino and organic ester radicals and alkyl radicals containing less than twenty carbon atoms; $b$ represents the number of $Y_b$s and is equal to zero or a whole number corresponding to the replaceable hydrogens on the nucleus T not substituted with $R^v$ and $(Z.COOH)$; and $n$ is a whole number from 1 to 4.

ORLAND M. REIFF.
FERDINAND P. OTTO.
JOHN J. GIAMMARIA.
EDWARD A. OBERRIGHT.